(12) United States Patent
Huang et al.

(10) Patent No.: US 9,916,486 B2
(45) Date of Patent: Mar. 13, 2018

(54) METHOD AND APPARATUS FOR MOBILE TERMINAL TO PROCESS VISUAL GRAPHICS CODE

(71) Applicant: Beijing Qihoo Technology Company Limited, Beijing (CN)

(72) Inventors: Liqiang Huang, Beijing (CN); Haiyin Shen, Beijing (CN); Zhaochun Song, Beijing (CN); Jiankai Zhao, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 0 days.

(21) Appl. No.: 14/896,307

(22) PCT Filed: Jun. 4, 2014

(86) PCT No.: PCT/CN2014/079166
§ 371 (c)(1),
(2) Date: Dec. 4, 2015

(87) PCT Pub. No.: WO2014/194827
PCT Pub. Date: Dec. 11, 2014

(65) Prior Publication Data
US 2016/0132706 A1  May 12, 2016

(30) Foreign Application Priority Data
Jun. 5, 2013  (CN) .......................... 2013 1 0222241

(51) Int. Cl.
*G06K 19/00* (2006.01)
*G06K 7/10* (2006.01)
*G06K 7/14* (2006.01)

(52) U.S. Cl.
CPC ........... *G06K 7/10722* (2013.01); *G06K 7/10* (2013.01); *G06K 7/1413* (2013.01)

(58) Field of Classification Search
USPC ................................ 235/435, 439, 454, 462
See application file for complete search history.

(56) References Cited

U.S. PATENT DOCUMENTS

| | | | | |
|---|---|---|---|---|
| 2007/0063050 A1* | 3/2007 | Attia | ................. | G06F 17/30879 235/462.46 |
| 2011/0290879 A1* | 12/2011 | Guo | .................. | G06K 7/10851 235/437 |
| 2013/0206832 A1* | 8/2013 | Hashimoto | ....... | G06F 17/30265 235/375 |

FOREIGN PATENT DOCUMENTS

| CN | 101043643 A | 9/2007 |
|---|---|---|
| CN | 101211357 A | 7/2008 |

(Continued)

OTHER PUBLICATIONS

International Search Report and Written Opinion from International Patent Application No. PCT/CN2014/079166 dated Sep. 3, 2014.

*Primary Examiner* — Matthew Mikels
(74) *Attorney, Agent, or Firm* — Alston & Bird LLP (57) ABSTRACT

The present invention discloses a method and apparatus for a mobile terminal to process a visual graphics code. The method mainly comprises: obtaining a digital image recorded by the mobile terminal; analyzing the digital image to obtain a visual graphics code in the digital image; decoding the visual graphics code and classifying decoded information obtained after decoding; and processing the decoded information according to the classification of the decoded information. The present invention can achieve an effect that the mobile terminal can adaptively recognize and process various types of visual graphics codes, and greatly enhance the ability for the mobile terminal to intelligently process a visual graphics code, thereby improving the function of the mobile terminal, and causing the mobile terminal to meet the need of a user better.

18 Claims, 4 Drawing Sheets

(56) References Cited

FOREIGN PATENT DOCUMENTS

| | | |
|---|---|---|
| CN | 102136058 A | 7/2011 |
| CN | 102883322 A | 1/2013 |
| CN | 103279730 A | 9/2013 |
| CN | 103366149 A | 10/2013 |

* cited by examiner

METHOD AND APPARATUS FOR MOBILE TERMINAL TO PROCESS VISUAL GRAPHICS CODE

FIELD OF THE INVENTION

The invention relates to the field of visual graphics coding technologies, and in particular, to a method and apparatus for a mobile terminal to process a visual graphics code.

BACKGROUND OF THE INVENTION

A two-dimensional code belongs to one kind of visual graphics codes. It uses a certain kind of geometrical graphics to record data symbol information on graphics distributed in a planar (two dimensional) in black and white according to a certain rule, skillfully utilizes in coding the concept of "0", "1" bit stream which forms the basis of internal logic of a computer, and represents literal and numeric information using several geometrical solids corresponding to the binary system, and can be automatically recognized and read using an image input device or a photoelectric scanning device to realize automatic information processing.

A two-dimensional code may store various information, which mainly comprises a website address, a business card, text information, and a specific code, etc. As a new way of recording information and a convenient internet portal, the two-dimensional code is widely used gradually.

Nowadays, a method for processing two-dimensional code information by a mobile terminal such as a mobile phone in the traditional technologies mainly comprises: a mobile terminal such as a mobile phone downloading a piece of two-dimensional code recognition software from a network and installing it, opening the two-dimensional code recognition software in the mobile terminal such as the mobile phone when encountering a picture containing two-dimensional code information, and then placing the two-dimensional code in the picture in a two-dimensional code scanning area of the recognition software, and obtaining the two-dimensional code information in the picture through the recognition software. Then, direct presentation processing is performed on the information such as a website, a business card and a commodity in the two-dimensional code information by various application software owned by the mobile phone itself, for example, when the two-dimensional code information is a website address, then a browser selection interface is popped up to open the website address; when the two-dimensional code information is a business card, a contact adding interface is popped up; and when the two-dimensional code information is a commodity, a commodity information interface is popped up.

The disadvantage of the method for processing two-dimensional code information by a mobile terminal such as a mobile phone in the traditional technologies lies in that the method can only perform the direct presentation processing on limited several kinds of two-dimensional code information such as website address, business cards and commodity information through various application software owned by the mobile terminal such as the mobile phone itself, and can not be adapted to and process more types of two-dimensional code.

The method performs the direct presentation processing on two-dimensional code information by various application software owned the mobile phone itself, the processing procedure is too simple, and likely brings a security risk.

SUMMARY OF THE INVENTION

In view of the above problems, the invention is proposed to provide a method for a mobile terminal to process a visual graphics code and a corresponding apparatus for a mobile terminal to process a visual graphics code, which overcome the above problems or at least partly solve the above problems.

According to an aspect of the invention, there is provided a method for a mobile terminal to process a visual graphics code, comprising:

obtaining a digital image recorded by the mobile terminal;

analyzing the digital image to obtain a visual graphics code in the digital image;

decoding the visual graphics code and classifying decoded information obtained after decoding; and processing the decoded information according to the classification of the decoded information.

Optionally, the analyzing the digital image to obtain the visual graphics code in the digital image comprises:

determining that the digital image contains a visual graphics code and extracting the visual graphics code from the digital image, when it is detected that a positioning graphics of the visual graphics code exists in the digital image.

According to another aspect of the invention, there is provided an apparatus for a mobile terminal to process a visual graphics code comprising:

a digital image obtaining module configured to obtain a digital image recorded by the mobile terminal;

a visual graphics code obtaining module configured to analyze the digital image to obtain a visual graphics code in the digital image;

a decoded information classifying module configured to decode the visual graphics code and classify decoded information obtained after decoding; and a decoded information processing module configured to process the decoded information according to the classification of the decoded information.

According to the above technical solutions of the invention, a visual graphics code in the digital image can be obtained, decoded information of the visual graphics code obtained after decoding is classified, and the processing is performed on the decoded information according to the classification of the decoded information. Therefore, an effect that the mobile terminal can adaptively recognize and process various visual graphics codes that need different types of operation is achieved, and the ability for the mobile terminal to intelligently process a visual graphics code is greatly enhanced, thereby improving the function of the mobile terminal, and causing the mobile terminal to meet the need of a user better.

The application overcomes the disadvantage that the operations of coding and decoding a visual graphics by a user are tedious, such that the user does not need to, as before, find the software that processes the visual graphics code first, and enter the visual graphics code scanning interface of the software so as to be able to recognize the visual graphics code and process the decoded information. Using the present invention, the type corresponding to the decoded information after decoding can be directly recognized, and a corresponding processing measure to process the decoded information is invoked, thereby realizing a solution which can automatically process different types of visual graphics codes, simplifying the efficiency of processing a visual graphics code by a user via a mobile terminal, and saving the operation time of the user.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages of the invention can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. In the drawings.

DETAILED DESCRIPTION OF THE INVENTION

In the following exemplary embodiments of the disclosure will be described in more detail with reference to the accompanying drawings. While the exemplary embodiments of the disclosure are shown in the drawings, it will be appreciated that the disclosure may be implemented in various forms and should not be limited by the embodiments set forth herein. Rather, these embodiments are provided in order for one to be able to more thoroughly understand the disclosure and in order to be able to fully convey the scope of the disclosure to those skilled in the art.

Embodiment One

Figure 1:
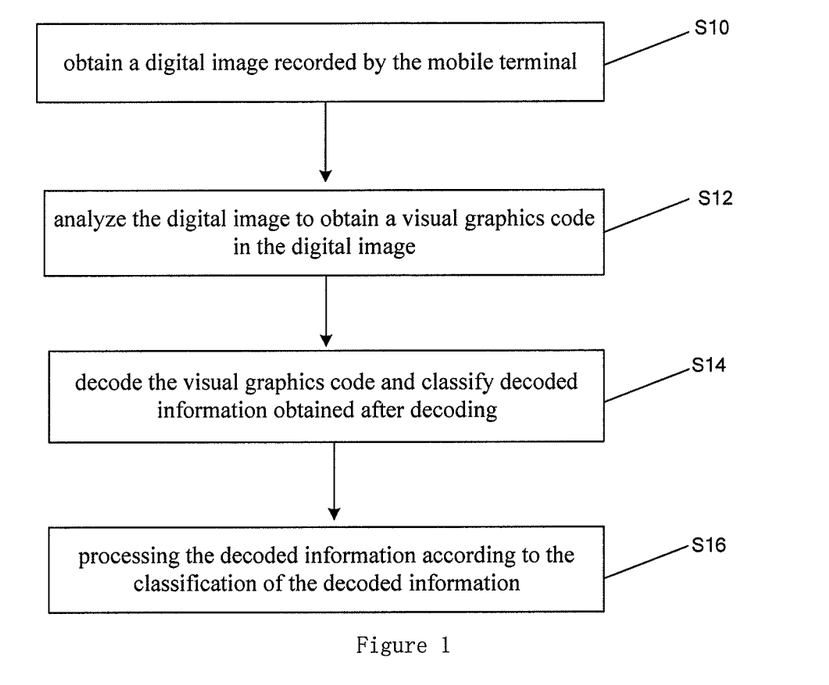
FIG. 1 shows a processing flow chart of a method for a mobile terminal to process a visual graphics code according to embodiment One of the present invention.

A processing flow of a method for a mobile terminal to process a visual graphics code provided by this embodiment is as shown in FIG. 1 and comprises the following processing steps.

In step S10, a digital image recorded by the mobile terminal is obtained.

In step S12, the digital image is analyzed to obtain a visual graphics code in the digital image.

It is determined that the digital image contains a visual graphics code and the visual graphics code is extracted from the digital image, when it is detected that a positioning graphics of the visual graphics code exists in the digital image.

The coordinates of the center point of the positioning graphics of the visual graphics code in the digital image is obtained, and the coordinates and orientation of the center point of the visual graphics code in the digital image are determined according to the coordinates of the center point of the positioning graphics.

The visual graphics code is extracted from the digital image according to the coordinates and orientation of the center point of the visual graphics code.

The visual graphics code mentioned above may comprise a barcode or a two-dimensional code.

In step S14, the visual graphics code is decoded and the decoded information obtained after decoding is classified.

The decoded information obtained after decoding is classified according to a specified character string or a specific format comprised in the decoded information.

The classification of the decoded information comprises at least one of the following: exhibition category, storage category, category of invoking an application for processing, and category of authenticating security by a server.

In addition, the invention can further have many other classification ways. The classification of the decoded information can be further classified according to the function of the decoded information, and if it is classified according to the function, at least one of the following is comprised: mail class, business card class, telephone dial class, short message class, and URL information class.

When the character string is a piece of numbers or letters with a fixed length, it is determined that the category of the decoded information is commodity information in the exhibition category, and the commodity information is displayed by a display window.

When the character string begins with "VCARD" or "MECARD", it is determined that the category of the decoded information is business card information in the storage category, and the business card information is stored in a contact database of the mobile terminal.

When the character string comprises characters in the form of URL, it is determined that the category of the decoded information is URL information in the category of authenticating security by a server, and the URL information is sent to a server, and the security authentication result of the URL information returned by the server is received.

When the character string comprises characters in the form of market://, it is determined that the category of the decoded information is electronic market application download link information in the category of authenticating security by a server, and the URL information is sent to a server, and the security authentication result of the electronic market application download link information returned by the server is received.

When the character string comprises characters in the form of mailto, it is determined that the category of the decoded information is mail information in the category of invoking an application for processing, and the mail information is processed by an e-mail system.

When the character string comprises characters in the form of tel, it is determined that the category of the decoded information is telephone information in the category of invoking an application for processing, and the telephone information is processed by a speech processing system.

When the character string comprises characters in the form of sms, it is determined that the category of the decoded information is short message information in the category of invoking an application for processing, and the short message information is processed by a short message system.

The visual graphics code comprises a barcode or a two-dimensional code.

In step S16, processing is performed on the decoded information according to the classification of the decoded information.

The processing is performed on the decoded information according to the classification of the decoded information and/or by invoking a corresponding program according to the decoded information. A specific processing procedure may comprise the following.

The decoded information is exhibited by a display window of the mobile terminal.

The decoded information is stored in a specified database of the mobile terminal.

The decoded information is processed by an application of the mobile terminal's own or an external application.

The decoded information is sent to a server, and the security authentication result of the decoded information returned by the server is received.

When the category of the decoded information is commodity information, the barcode information of the commodity is sent to a server, and after the security authentication information of the commodity returned by the server is received, the basic information and the security authentication information of the commodity is displayed by a display window.

When the category of the decoded information is URL information, the mobile terminal sends the website information to a server, such that the server detects whether the URL information has gone through a security authentication through a network shield technique, and when the information indicates that the URL information has passed a security authentication returned by the server is received, the website address is opened by a browser; and when the information indicates that the URL information has not gone through the security authentication returned by the server is received, the URL information is not opened.

When the category of the decoded information is business card information, the mobile terminal judges whether the address book saved inside it contains the contact information in the business card, and if yes, the contact information will not be added in the address book; otherwise, various basic information comprised in the contact information is obtained and added in the address book by one click.

The contact information is sent to a server, such that the server obtains other relevant information than the business card of the contact via the internet according to the contact information, and after the other relevant information returned by the server is received, the basic information and the other relevant information of the contact is displayed by a display window.

When text information is obtained from the decoded information, the mobile terminal invokes a text editor and opens the text information using the text editor.

When wifi information is obtained from the decoded information, the mobile terminal invokes a wifi connection program of the system to connect a specified will hotspot using content provided in the wifi information.

When a telephone number is obtained from the decoded information, the mobile terminal invokes a dialing program and fills the telephone number in a number input box.

When short message information is obtained from the decoded information, the mobile terminal invokes a short message management program and fills corresponding content of the short message information in positions of the addressee of the short message and the short message content.

When mail information is obtained from the decoded information, the mobile terminal invokes a mail management program and fills corresponding content of the mail information in positions of the addressee and the mail content.

Embodiment Two

Opening the camera of a mobile phone, photographing a two-dimensional code, the mobile phone performing an automatic recognition, and performing subsequent processing are operations most consistent with the habit of a user. Based on the above operations that a user is used to, the present invention provides a method for a mobile terminal to process a visual graphics code, wherein a two-dimensional code recognition device and a photographing device are disposed in the mobile terminal, and the two-dimensional code recognition device monitors the photographing device.

The mobile terminal may comprise a mobile communication terminal or a tablet computer or a digital camera. In the following, that the mobile terminal is a mobile communication terminal and the visual graphics code is a two-dimensional code is taken as an example to describe the invention.

Figure 2:
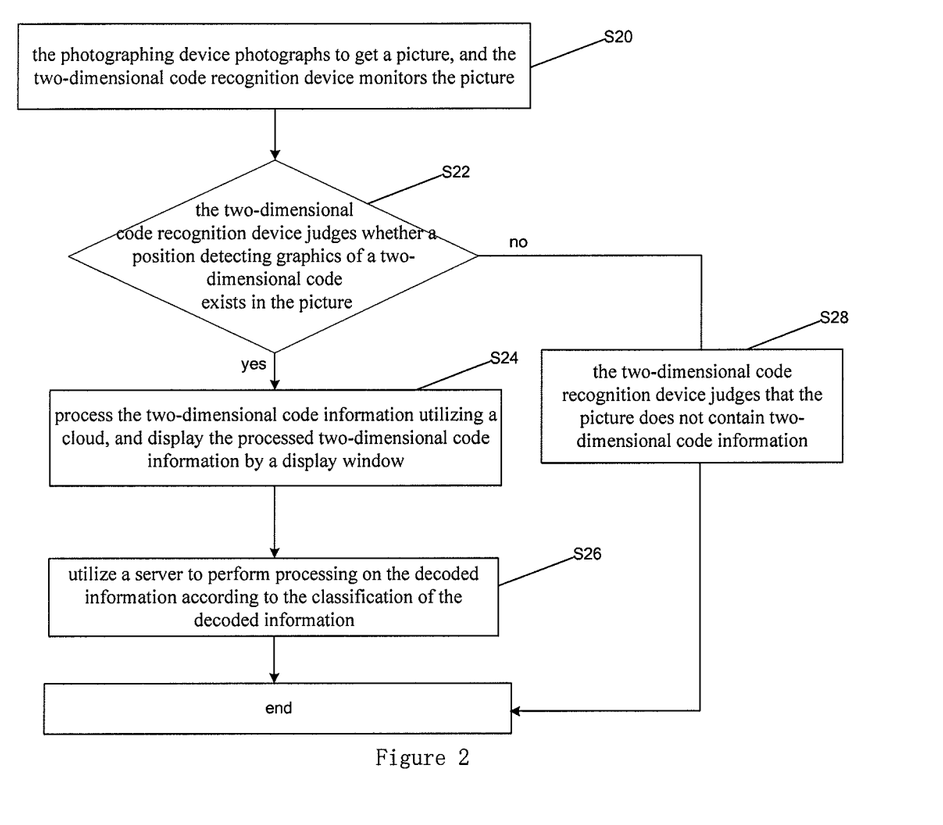
FIG. 2 shows a processing flow chart of a method for a mobile communication terminal to process a two-dimensional code according to embodiment Two of the present invention.

The processing flow of the method for a mobile communication terminal to process a two-dimensional code is as shown in FIG. 2, and comprises the following processing steps.

In step S20, the photographing device photographs to get a picture, and the two-dimensional code recognition device monitors the picture.

Both the photographing device and the two-dimensional code recognition device in the mobile communication terminal are enabled, and meanwhile, the two-dimensional code recognition device starts to monitor the photographing device. In the present invention, the two-dimensional code recognition device may employ one of the following three monitoring modes to monitor the photographing device.

Monitoring mode 1: the two-dimensional code recognition device monitors in real time a memory address of a picture file corresponding to the photographing device, and when it is monitored that a new picture file is added in the memory address, the new picture file is taken as the monitored picture file.

The two-dimensional code recognition device directly listens to a read/write event of a file system via an API provided by the operating system. When the photographing device takes a photo successfully, the camera will generate a photo file and store the photo file in the memory address of the picture file corresponding to the photographing device, and the two-dimensional code recognition device monitors the photo file via the API.

As compared to a polling mode, the advantages of such a monitoring mode are evident. First, when no photos are generated, the CPU resource will not be consumed, which saves the CPU resource relatively. Second, the real-timing is relatively good, and when an event happens, a notification can be received at a millisecond level. For the polling mode, if the period is very short, for example, 100 milliseconds, the CPU is consumed a lot, and if the period is too long, for example, 3 seconds, the delay effect is comparatively apparent.

A kind of code corresponding to this monitoring mode is as follows:

```
File target = Environment.DIRECTORY_DCIM;
    File dir = Environment.getExternalStoragePublicDirectory(target);
    int flags = FileObserver.CLOSE_WRITE;
    LocalFileObserver ob = new LocalFileObserver(path, flags);
    ob.startWatching( );
class LocalFileObserver extends FileObserver {
    @Override
    public void onEvent(int event, String path) {
      // processing
    }
```

Monitoring mode 2: the two-dimensional code recognition device monitors in real time the system activity of the mobile terminal, and when it is monitored that the photographing device has finished the activity procedures from starting to photographing to storing a picture file, the picture file stored the latest by the photographing device is taken as the monitored picture file.

For an Android operating system, there is a system component, the Activity manager. The Activity manager manages all the active Activities (namely, the graphical user interface, i.e., GUI element in the system), and the photographing activity of a system camera is also an independent Activity.

When any one Activity is started or closed, the Activity manager will send a notification to all the observers that register with the Activity manager, wherein the content of the notification comprises the start, stop, change, etc. of the Activity.

The two-dimensional code recognition device registers with the Activity manager as an observer, and receives notification events of all Activities sent by the Activity manager. According to the received notification events of all Activities, the two-dimensional code recognition device judges that the system camera has finished the activity procedures from starting to photographing to storing a picture file.

A kind of code corresponding to this monitoring mode is as follows:

```
Class<?> amnClass = Class.forName("android.app.
ActivityManagerNative");
    Object amnObject = amnClass.getMethod("getDefault").invoke(null);
    if (register) {
        Class<?> c = IActivityWatcher.class;
        Method m = amnClass.getMethod("registerActivityWatcher", c);
        m.invoke(amnObject, watcher);
    }
private final Callback watcher = new Callback( ) {
    @Override
    public void onTopActivityChanged(ComponentName cn) {
        if (CameraUtils.isCameraUI(cn)) {
            // processing
        }
    }
}
```

Monitoring mode 3: the two-dimensional code recognition device monitors in real time the display screen of the photographing device, and when it is monitored that the display screen of the photographing device is enabled and a picture in the display screen is kept a set duration (e.g., 5 seconds), the picture in the display screen is taken as the monitored picture file. This monitoring mode can recognize a two-dimensional code photo when a user has not yet directly photograph to generate a photo.

For an Android system based on a Linux kernel, the screen display device has a bitmap buffer. The buffer is open to an application which has a root privilege (the highest privilege).

The two-dimensional code recognition device obtains the root privilege by the way of a user granting, and then reads the buffer of the screen device via an API. A specific approach is to obtain a file number via a device file fb0, then obtain information of the size and the bitmap depth of the display screen of the photographing device through the fcntl system, and read out each row of pixels of the display screen through the information of the size and the bitmap depth.

A kind of code corresponding to this monitoring mode is as follows:

```
FILE* fb_in;
    int fb;
    struct fb_var_screeninfo vinfo;
    char imgbuf[0x10000];
    unsigned int r, rowlen;
    unsigned int bytespp;
    // open the screen device
    fb_in = fopen("/dev/graphics/fb0", "r");
    fb = fileno(fb_in);
    fb_in = fdopen(fb, "r");
    // read information of the size and pixels of the screen
    if(ioctl(fb, FBIOGET_VSCREENINFO, &vinfo) < 0) {
        return;
    }
    fcntl(fb, F_SETFD, FD_CLOEXEC);
    bytespp = vinfo.bits_per_pixel / 8;
    rowlen = vinfo.xres * bytespp;
    for(r=0; r<vinfo.yres; r++) {
        // read a row of pixels
        int len = fread(imgbuf, 1, rowlen, fb_in);
        if (len <= 0) break;
        // record a row of Raw data of a picture
    }
    fclose(fb_in);
```

The photographing device focuses a picture, and photographs the picture after the focus is determined. The two-dimensional code recognition device monitors the picture photographed by the photographing device just now according to one of the above three monitoring modes.

In step S22, according to information of the preset position and graphical feature of a positioning graphics of a two-dimensional code, the two-dimensional code recognition device performs two-dimensional code recognition processing on the picture, judges whether a positioning graphics of a two-dimensional code exists in the picture, and if yes, determines that the picture contains two-dimensional code information and executes step S24; otherwise, executes step S28.

The positioning graphics is used for positioning a two-dimensional code picture.

In a practical application, the positioning graphics may be located at the top left corner, the top right corner, the bottom left corner, just for example. The present invention is not limited to the above specific ways of arranging the positioning graphics in a two-dimensional code graphics, and any way of arranging the positioning graphics in a two-dimensional code picture falls within the protection scope of the invention.

In step S24, when the two-dimensional code recognition device recognizes that the picture information contains two-dimensional code information, it decodes the two-dimensional code information, and classifies the decoded information obtained after decoding.

A byte stream in the binary format of the decoded information is obtained, and the byte stream in the binary format is transformed to a character string.

When the character string is a piece of numbers or letters with a fixed length, it is determined that the category of the decoded information is commodity information.

When the character string begins with "VCARD" or "MECARD", it is determined that the category of the decoded information is business card information.

When the character string comprises characters in the form of URL, it is determined that the category of the decoded information is URL information.

When the character string comprises characters in the form of market://, it is determined that the category of the decoded information is electronic market application download link information.

When the character string comprises characters in the form of mailto, it is determined that the category of the decoded information is mail information.

When the character string comprises characters in the form of tel, it is determined that the category of the decoded information is telephone information.

When the character string comprises characters in the form of sms, it is determined that the category of the decoded information is short message information.

In step S26, a server is utilized to perform processing on the decoded information according to the classification of the decoded information.

The server is utilized to perform processing on the two-dimensional code information, and the processed two-dimensional code information is displayed by a display window.

A specific procedure of utilizing the server to perform processing on the two-dimensional code information may comprise the following.

For example, when the two-dimensional code information comprises website address information, the mobile terminal sends the website address information to the server.

The server detects whether the website address information has gone through a security authentication by a network shield technique, and if yes, the server sends to the mobile terminal information that the website address information has gone through a security authentication, and the mobile terminal opens the website address by a browser; otherwise, the server sends to the mobile terminal information that the website information has not gone through a security authentication, the mobile terminal determines that the website address information is suspicious and might be a phishing site or the like, and the mobile terminal will not open the website address information.

Part of the code for the security authentication of the website information by the server provided by the embodiment is as follows:

```
String combo = "urlsafe ";
addBoundary(buffer, "urls", info.tempMd5Seq + "\t" + postedUrl + "\n");
addBoundary(buffer, "product", "mobile");//wd
addBoundary(buffer, "combo", combo);
addBoundary(buffer, "v", "3");
HttpClient client = getHttpClient( );
HttpPost post = new HttpPost(info.requestUrl);
post.setHeader("Content-Type", "multipart/form-data;boundary=" + BOUNDARY);
post.setEntity(info.entity);
HttpResponse response = client.execute(post);
if (response.getStatusLine( ).getStatusCode( ) == 200) {
  String[ ] results = entries[i].split("\t");
  if (results.length < 3) {
  continue;
  } else {
  urltype = Integer.parseInt(results[1]);
  if (urltype != 0)//not an safe url
  {
    info.urlType = urltype;
  }
  try{
    info.extras.add(new Extra(results[0],urltype,results[2]));
  }catch(Exception e){
  }
  }
}
```

For another example, when the two-dimensional code information comprises barcode information of a commodity, the mobile terminal sends the barcode information of the commodity to a server.

The server queries a commodity information database according to the barcode information of the commodity, and obtains security authentication information of the commodity, wherein the security authentication information may comprise whether the commodity is secure, whether it has a quality problem, whether it is poisonous, whether it is suspicious, or the like. The server sends the security authentication information to the mobile terminal, and the mobile terminal displays the basic information and the security authentication information of the commodity via a display window.

For another example, when the two-dimensional code information comprises contact information, the mobile terminal judges whether the address book saved inside it contains the contact information, and if yes, the contact information will not be added in the address book; otherwise, various basic information comprised in the contact information is obtained and added in the address book by one click.

The mobile terminal sends the contact information to a server, the server obtains additional relevant information of the contact via the internet according to the contact information and sends the additional relevant information to the mobile terminal, and the mobile terminal displays the basic information and the additional relevant information of the contact via a display window. The additional relevant information may comprise a personal blog, a microblog, etc.

Part of the code for adding various basic information of a contact in a address book provided by the embodiment is as follows:

```
ArrayList<ContentProviderOperation> ops = new ArrayList<ContentProviderOperation> ( );
int rawId = 0;
ops.add(ContentProviderOperation.newInsert(RawContacts.CONTENT_URI)
    .withValue(RawContacts.ACCOUNT_TYPE, null)
    .withValue(RawContacts.ACCOUNT_NAME, null)
    .build( ));
// name
if (!TextUtils.isEmpty(result.mBuiltName)) {
ops.add(ContentProviderOperation.newInsert(android.provider.ContactsContract.Data.
CONTENT_URI)
        .withValueBackReference(ContactsContract.Data.RAW_CONTACT_ID, rawId)
        .withValue(ContactsContract.Data.MIMETYPE,
ContactsContract.CommonDataKinds.StructuredName.CONTENT_ITEM_TYPE)
```

```
        .withValue(ContactsContract.CommonDataKinds.StructuredName.GIVEN_NAME,
result.mBuiltName)
            .build( ));
    }
    // position
    String title = result.mABR.getTitle( );
    if (!TextUtils.isEmpty(title)) {
        ops.add(ContentProviderOperation.newInsert(android.provider.ContactsContract.Data.CONTENT_URI)
            .withValueBackReference(ContactsContract.Data.RAW_CONTACT_ID, rawId)
            .withValue(ContactsContract.Data.MIMETYPE,
ContactsContract.CommonDataKinds.Organization.CONTENT_ITEM_TYPE)
            .withValue(ContactsContract.CommonDataKinds.Organization.TITLE, title)
            .withValue(ContactsContract.CommonDataKinds.Organization.TYPE,
ContactsContract.CommonDataKinds.Organization.TYPE_WORK)
            .build( ));
    }
    // telephone number
    String numbers[ ] = result.mABR.getPhoneNumbers( );
    if (numbers != null && numbers.length > 0) {
        ops.add(ContentProviderOperation.newInsert(android.provider.ContactsContract.Data.CONTENT_URI)
            .withValueBackReference(ContactsContract.Data.RAW_CONTACT_ID, rawId)
            .withValue(ContactsContract.Data.MIMETYPE,
ContactsContract.CommonDataKinds.Phone.CONTENT_ITEM_TYPE)
            .withValue(ContactsContract.CommonDataKinds.Phone.NUMBER, numbers[0])
            .withValue(ContactsContract.CommonDataKinds.Phone.TYPE,
ContactsContract.CommonDataKinds.Phone.TYPE_MOBILE)
            .build( ));
    }
    // mail
    String emails[ ] = result.mABR.getEmails( );
    if (emails != null && emails.length > 0) {
        ops.add(ContentProviderOperation.newInsert(android.provider.ContactsContract.Data.CONTENT_URI)
            .withValueBackReference(ContactsContract.Data.RAW_CONTACT_ID, rawId)
            .withValue(ContactsContract.Data.MIMETYPE,
ContactsContract.CommonDataKinds.Email.CONTENT_ITEM_TYPE)
            .withValue(ContactsContract.CommonDataKinds.Email.ADDRESS, emails[0])
            .withValue(ContactsContract.CommonDataKinds.Email.TYPE,
ContactsContract.CommonDataKinds.Email.TYPE_WORK)
            .build( ));
    }
    // address
    if (!TextUtils.isEmpty(result.mTempAddresses)) {
        ops.add(ContentProviderOperation.newInsert(android.provider.ContactsContract.Data.CONTENT_URI)
            .withValueBackReference(ContactsContract.Data.RAW_CONTACT_ID, rawId)
            .withValue(ContactsContract.Data.MIMETYPE,
ContactsContract.CommonDataKinds.StructuredPostal.CONTENT_ITEM_TYPE)
            .withValue(ContactsContract.CommonDataKinds.StructuredPostal.FORMATTED_ADDRESS,
result.mTempAddresses)
            .withValue(ContactsContract.CommonDataKinds.StructuredPostal.TYPE,
ContactsContract.CommonDataKinds.StructuredPostal.TYPE_WORK)
            .build( ));
    }
    // company/organization/institution
    String org = result.mABR.getOrg( );
    if (!TextUtils.isEmpty(org)) {
        ops.add(ContentProviderOperation.newInsert(android.provider.ContactsContract.Data.CONTENT_URI)
            .withValueBackReference(ContactsContract.Data.RAW_CONTACT_ID, rawId)
            .withValue(ContactsContract.Data.MIMETYPE,
ContactsContract.CommonDataKinds.Organization.CONTENT_ITEM_TYPE)
            .withValue(ContactsContract.CommonDataKinds.Organization.COMPANY, org)
            .withValue(ContactsContract.CommonDataKinds.Organization.TYPE,
ContactsContract.CommonDataKinds.Organization.TYPE_WORK)
            .build( ));
    }
    // comment
    String notes = result.mABR.getNote( );
    if (!TextUtils.isEmpty(notes)) {
        ops.add(ContentProviderOperation.newInsert(android.provider.ContactsContract.Data.CONTENT_URI)
            .withValueBackReference(ContactsContract.Data.RAW_CONTACT_ID, rawId)
            .withValue(ContactsContract.Data.MIMETYPE,
ContactsContract.CommonDataKinds.Note.CONTENT_ITEM_TYPE)
            .withValue(ContactsContract.CommonDataKinds.Note.NOTE, notes)
            .build( ));
```

```
}
// WEBSITE
String website = result.mABR.getURL( );
if (!TextUtils.isEmpty(website)) {
    ops.add(ContentProviderOperation.newInsert(android.provider.ContactsContract.Data.CONTENT_URI)
        .withValueBackReference(ContactsContract.Data.RAW_CONTACT_ID, rawId)
        .withValue(ContactsContract.Data.MIMETYPE,
ContactsContract.CommonDataKinds.Website.CONTENT_ITEM_TYPE)
        .withValue(ContactsContract.CommonDataKinds.Website.URL, website)
        .withValue(ContactsContract.CommonDataKinds.Website.TYPE,
ContactsContract.CommonDataKinds.Website.TYPE_WORK)
        .build( ));
}
ContentResolver cr = context.getContentResolver( );
ContentProviderResult[ ] results = cr.applyBatch(ContactsContract.AUTHORITY, ops);
```

The flow ends.

In step S28, the two-dimensional code recognition device judges that the picture does not contain two-dimensional code information, and the flow ends.

In a practical application, the two-dimensional code recognition device can be closed manually as needed, or in a case of monitoring that the memory card of the mobile communication terminal has been pulled out and the screen background has been closed, the two-dimensional code recognition device automatically closes the monitoring program, to avoid unnecessary CPU consumption and improve the battery life of the mobile communication terminal.

An example of the code for the two-dimensional code recognition device to automatically close the monitoring program provided by the present invention is as follows:

```
// event listening: Result event, contact request event
IntentFilter filter = new IntentFilter( );
    filter.addAction(Intent.ACTION_MEDIA_MOUNTED);
    filter.addAction(Intent.ACTION_MEDIA_UNMOUNTED);
    filter.addAction(Intent.ACTION_SCREEN_OFF);
    filter.addAction(Intent.ACTION_SCREEN_ON);
    registerReceiver(mReceiver, filter);
    @Override
    public void onReceive(Context context, Intent intent) {
        if (LOGD_ENABLED) {
            Log.d(TAG, "onReceive: action=" + intent.getAction( ));
        }
        if (Intent.ACTION_MEDIA_MOUNTED.equals(intent.getAction( ))) {
            mCameraMonitor.start( );
        } else if (Intent.ACTION_MEDIA_UNMOUNTED.equals(intent.getAction( ))) {
            mCameraMonitor.stop( );
        } else if (Intent.ACTION_SCREEN_OFF.equals(intent.getAction( ))) {
            mCameraMonitor.start( );
        } else if (Intent.ACTION_SCREEN_ON.equals(intent.getAction( ))) {
            mCameraMonitor.stop( );
```

It will be appreciated by those skilled in the art that the types of applications of the mobile terminal such as the mobile communication terminal or the tablet computer or the digital camera, etc. are just examples, and other types of applications of the mobile terminal which are available now or might appear in the future should be also comprised in the protection scope of the invention if they are applicable to embodiments of the invention, and are comprised herein by reference.

The embodiment utilizes a two-dimensional code recognition device to monitor a picture obtained by a photographing device by photographing, perform two-dimensional code recognition processing on the picture, and display the recognized two-dimensional code information. In the present invention, it is achieved that when people photographs a picture using a photographing device in a mobile terminal, two-dimensional code information contained in the photo can be recognized rapidly and displayed on the display screen of the mobile terminal. The present invention has characteristics such as a convenient and simple operation, a high two-dimensional code recognition rate, a strong error correction capability, strong applicability, etc.

By utilizing a server to perform a security verification processing on website address information and barcode information of a commodity in two-dimensional code information, the embodiment can effectively guarantee the security of the two-dimensional code information displayed in the mobile terminal. It can be achieved that business card information in a two-dimensional code and additional relevant information searched out by the server is added intelligently in the address book of the mobile terminal.

Embodiment Three

Figure 3:
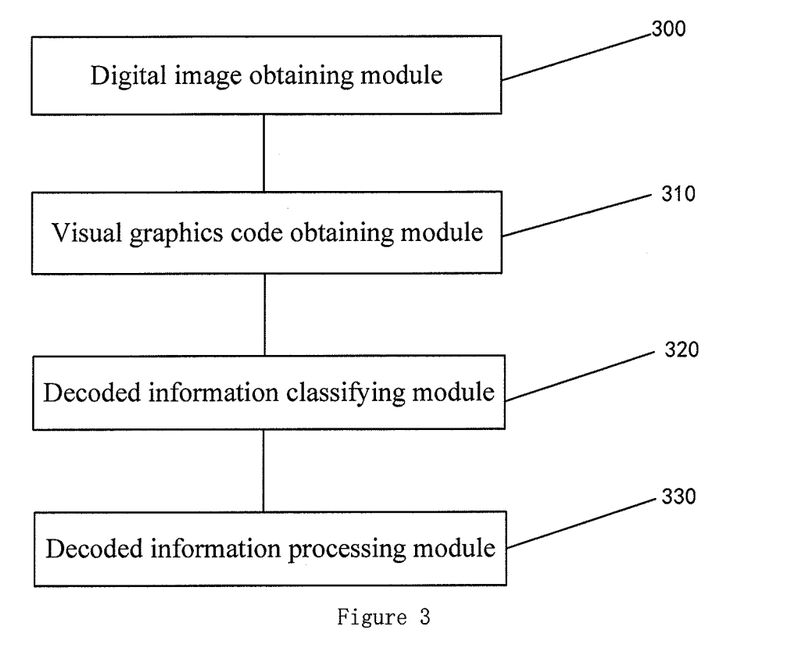
FIG. 3 shows a specific structural diagram of an apparatus for a mobile terminal to process a visual graphics code according to embodiment Three of the present invention.

This embodiment provides an apparatus for a mobile terminal to process a visual graphics code, of which a specific structural schematic diagram is as shown in FIG. 3, comprising:

a digital image obtaining module 300 configured to obtain a digital image recorded by the mobile terminal;

a visual graphics code obtaining module 310 configured to analyze the digital image to obtain a visual graphics code in the digital image;

a decoded information classifying module 320 configured to decode the visual graphics code and classify decoded information obtained after decoding; and a decoded information processing module 330 configured to process the decoded information according to the classification of the decoded information.

The visual graphics code obtaining module 310 is specifically configured to determine that the digital image contains a visual graphics code and extract the visual graphics code from the digital image, when it is judged that a positioning graphics of the visual graphics code exists in the digital image;

configured to obtain the coordinates of the center point of the positioning graphics of the visual graphics code in the digital image, and determine the coordinates and orientation of the center point of the visual graphics code in the digital image according to the coordinates of the center point of the positioning graphics; and extract the visual graphics code from the digital image according to the coordinates and orientation of the center point of the visual graphics code.

The decoded information classifying module 320 is configured to classify the decoded information obtained after decoding according to a specified character string or a specific format comprised in the decoded information.

The classification of the decoded information comprises at least one of the following: exhibition category, storage category, category of invoking an application for processing, and category of authenticating security by a server.

When the character string is a piece of numbers or letters with a fixed length, it is determined that the category of the decoded information is commodity information in the exhibition category, and the commodity information is displayed by a display window.

When the character string begins with "VCARD" or "MECARD", it is determined that the category of the decoded information is business card information in the storage category, and the business card information is stored in a contact database of the mobile terminal.

When the character string comprises characters in the form of URL, it is determined that the category of the decoded information is URL information in the category of authenticating security by a server, and the URL information is sent to a server, and the security authentication result of the URL information returned by the server is received.

When the character string comprises characters in the form of market://, it is determined that the category of the decoded information is electronic market application download link information in the category of authenticating security by a server, and the URL information is sent to a server, and the security authentication result of the electronic market application download link information returned by the server is received.

When the character string comprises characters in the form of mailto, it is determined that the category of the decoded information is mail information in the category of invoking an application for processing, and the mail information is processed by an e-mail system.

When the character string comprises characters in the form of tel, it is determined that the category of the decoded information is telephone information in the category of invoking an application for processing, and the telephone information is processed by a speech processing system.

When the character string comprises characters in the form of sms, it is determined that the category of the decoded information is short message information in the category of invoking an application for processing, and the short message information is processed by a short message system.

The visual graphics code comprises a barcode or a two-dimensional code.

The decoded information processing module 330 is configured to process the decoded information according to the classification of the decoded information and/or by invoking a corresponding program according to the decoded information.

A specific processing procedure comprises the following.

The decoded information is exhibited by a display window of the mobile terminal.

The decoded information is stored in a specified database of the mobile terminal.

The decoded information is processed by an application of the mobile terminal's own or an external application.

The mobile terminal sends the decoded information to a server, and receives the security authentication result of the decoded information returned by the server.

When the category of the decoded information is commodity information, the barcode information of the commodity is sent to a server, and after the security authentication information of the commodity returned by the server is received, the basic information and the security authentication information of the commodity is displayed by a display window.

When Wifi information is obtained from the decoded information, the mobile terminal invokes a wifi connection program of the system to connect a specified wifi hotspot using content provided in the wifi information.

The specific procedure of performing visual graphics code processing by the apparatus of the embodiment of the invention is similar to the embodiment of the above method, and will not be repeated here.

In summary, the present invention can obtain a visual graphics code in the digital image, classify decoded information of the visual graphics code obtained after decoding, and perform processing on the decoded information according to the classification of the decoded information. Therefore, an effect that the mobile terminal can adaptively recognize and process different types of visual graphics codes is achieved, and the ability for the mobile terminal to intelligently process a visual graphics code is greatly enhance, thereby improving the function of the mobile terminal, and causing the mobile terminal to meet the need of a user better.

By utilizing a server to perform security verification processing on website address information and barcode information of a commodity in a visual graphics code such as two-dimensional code information, etc., the present invention can effectively guarantee the security of the two-dimensional code information displayed in the mobile terminal. It can be achieved that business card information in a visual graphics code such as a two-dimensional code, etc. is added intelligently in the address book of the mobile terminal.

The algorithms and displays provided here are not inherently related to any specific computer, virtual system or other device. Various general-purpose systems may also be used with the teachings herein. According to the above description, the structure required for constructing such systems is obvious. In addition, the invention is not directed to any specific programming language. It should be understood that the content of the invention described herein may be carried out utilizing various programming languages, and that the above description for a specific language is for the sake of disclosing preferred embodiments of the invention.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

Similarly, it shall be appreciated that in order to simplify the disclosure and help the understanding of one or more of all the inventive aspects, in the above description of the exemplary embodiments of the invention, sometimes individual features of the invention are grouped together into a single embodiment, figure or the description thereof. However, the disclosed methods should not be construed as reflecting the following intention, namely, the claimed invention claims more features than those explicitly recited in each claim. More precisely, as reflected in the following claims, an aspect of the invention lies in being less than all the features of individual embodiments disclosed previously. Therefore, the claims complying with a particular implementation are hereby incorporated into the particular implementation, wherein each claim itself acts as an individual embodiment of the invention.

It may be appreciated to those skilled in the art that modules in a device in an embodiment may be changed adaptively and arranged in one or more device different from the embodiment. Modules or units or assemblies may be combined into one module or unit or assembly, and additionally, they may be divided into multiple sub-modules or sub-units or subassemblies. Except that at least some of such features and/or procedures or units are mutually exclusive, all the features disclosed in the specification (including the accompanying claims, abstract and drawings) and all the procedures or units of any method or device disclosed as such may be combined employing any combination. Unless explicitly stated otherwise, each feature disclosed in the specification (including the accompanying claims, abstract and drawings) may be replaced by an alternative feature providing an identical, equal or similar objective.

Furthermore, it can be appreciated to the skilled in the art that although some embodiments described herein comprise some features and not other features comprised in other embodiment, a combination of features of different embodiments is indicative of being within the scope of the invention and forming a different embodiment. For example, in the following claims, any one of the claimed embodiments may be used in any combination.

Embodiments of the individual components of the invention may be implemented in hardware, or in a software module running on one or more processors, or in a combination thereof. It will be appreciated by those skilled in the art that, in practice, some or all of the functions of some or all of the components in a mobile terminal processing a visual graphics code according to individual embodiments of the invention may be realized using a microprocessor or a digital signal processor (DSP). The invention may also be implemented as a device or apparatus program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 4:
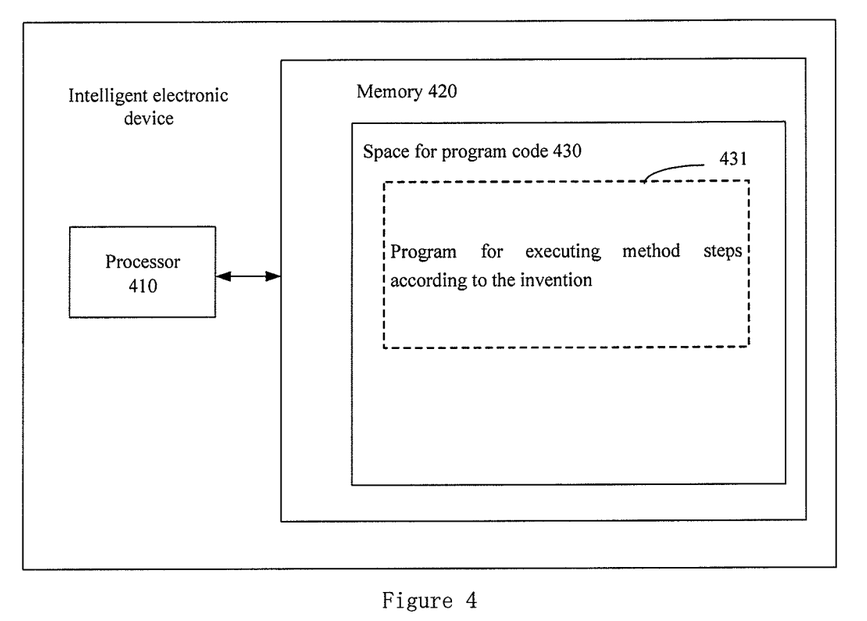
FIG. 4 shows a block diagram of an intelligent electronic device for carrying out a method according to the present invention.
Figure 5:
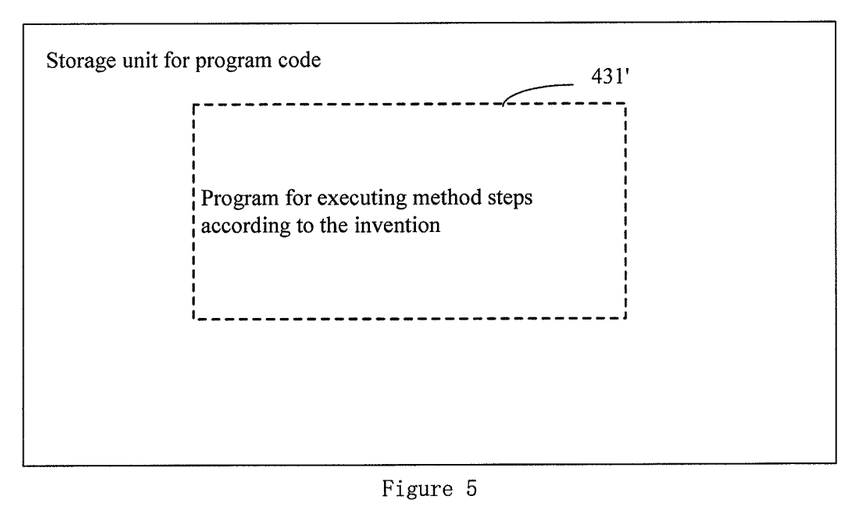
FIG. 5 shows a schematic diagram of a storage unit for retaining or carrying a program code implementing a method according to the present invention.

For example, FIG. 4 shows an intelligent electronic device which may carry out a method for a mobile terminal to process a visual graphics code according to the invention. The intelligent electronic device traditionally comprises a processor 410 and a computer program product or a computer readable medium in the form of a memory 420. The memory 420 may be an electronic memory such as a flash memory, an EEPROM (electrically erasable programmable read-only memory), an EPROM, a hard disk or a ROM. The memory 420 has a memory space 430 for a program code 431 for carrying out any method steps in the methods as described above. For example, the memory space 430 for a program code may comprise individual program codes 431 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 5. The storage unit may have a memory segment or a memory space, etc. arranged similarly to the memory 420 in the intelligent electronic device of FIG. 4. The program code may for example be compressed in an appropriate form. In general, the storage unit comprises a program 431' for executing method steps according to the invention, i.e., a code which may be read by e.g., a processor such as 410, and when run by an intelligent electronic device, the codes cause the intelligent electronic device to carry out individual steps in the methods described above.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several apparatuses, several of the apparatuses may be embodied by one and the same hardware item. Use of the words first, second, and third, etc. does not mean any ordering. Such words may be construed as naming.

The invention claimed is:

1. A method for a mobile terminal to process a visual graphics code comprising:
   obtaining a digital image recorded by the mobile terminal;
   analyzing the digital image to obtain a visual graphics code in the digital image;
   decoding the visual graphics code to obtain decoded information stored by the visual graphics code and classifying the decoded information, wherein a specified character string is contained in the decoded information; and
   processing the decoded information according to the classification of the decoded information;
   wherein, when the character string is a piece of numbers or letters with a fixed length, it is determined that the category of the decoded information is commodity information in an exhibition category, displaying the commodity information by a display window;
   when the character string begins with "VCARD" or "MECARD", it is determined that the category of the decoded information is business card information in a storage category, storing the business card information in a contact database of the mobile terminal;
   when the character string comprises characters in a form of URL, it is determined that the category of the decoded information is URL information in a category of authenticating security by a server, sending the URL information to a server, and receiving the security authentication result of the URL information returned by the server;
   when the character string comprises characters in a form of market://, it is determined that the category of the decoded information is electronic market application download link information in a category of authenticating security by a server, sending the URL information to a server, and receiving the security authentication result of the electronic market application download link information returned by the server;
   when the character string comprises characters in a form of mailto, it is determined that the category of the decoded information is mail information in a category of invoking an application for processing, processing the mail information by an e-mail system;

when the character string comprises characters in a form of tel, it is determined that the category of the decoded information is telephone information in a category of invoking an application for processing, processing the telephone information by a speech processing system; and/or when the character string comprises characters in a form of sms, it is determined that the category of the decoded information is short message information in a category of invoking an application for processing, processing the short message information by a short message system.

2. The method for a mobile terminal to process a visual graphics code as claimed in claim 1, wherein the analyzing the digital image to obtain the visual graphics code in the digital image comprises:

determining that the digital image contains a visual graphics code and extracting the visual graphics code from the digital image, when it is detected that a positioning graphics of the visual graphics code exists in the digital image.

3. The method for a mobile terminal to process a visual graphics code as claimed in claim 2, wherein the extracting the visual graphics code from the digital image comprises:

obtaining coordinates of a center point of the positioning graphics of the visual graphics code in the digital image, and determining coordinates and orientation of a center point of the visual graphics code in the digital image according to the coordinates of the center point of the positioning graphics; and extracting the visual graphics code from the digital image according to the coordinates and orientation of the center point of the visual graphics code.

4. The method for a mobile terminal to process a visual graphics code as claimed in claim 1, wherein the decoding the visual graphics code and classifying decoded information obtained after decoding comprises:

classifying the decoded information obtained after decoding according to a specific format comprised in the decoded information.

5. The method for a mobile terminal to process a visual graphics code as claimed in claim 1, wherein the classification of the decoded information comprises at least one of the following: exhibition category, storage category, category of invoking an application for processing, and category of authenticating security by a server.

6. The method for a mobile terminal to process a visual graphics code as claimed in claim 1, wherein the visual graphics code comprises a barcode or a two-dimensional code.

7. The method for a mobile terminal to process a visual graphics code as claimed in claim 1, wherein the processing the decoded information according to the classification of the decoded information comprises:

sending the decoded information to a server, and receiving a security authentication result of the decoded information returned by the server.

8. The method for a mobile terminal to process a visual graphics code as claimed in claim 1, wherein the processing the decoded information according to the classification of the decoded information comprises:

when the category of the decoded information is commodity information, sending barcode information of the commodity to a server, and after security authentication information of the commodity returned by the server is received, displaying basic information and the security authentication information of the commodity by a display window.

9. The method for a mobile terminal to process a visual graphics code as claimed in claim 1, wherein the processing the decoded information according to the classification of the decoded information comprises:

when wifi information is obtained from the decoded information, the mobile terminal invoking a wifi connection program of the system to connect a specified wifi hotspot using content provided in the wifi information.

10. A mobile terminal for processing a visual graphics code comprising:

a memory having instructions stored thereon;

a processor configured to execute the instructions to perform operations to process a visual graphics code, comprising:

obtaining a digital image recorded by the mobile terminal;

analyzing the digital image to obtain a visual graphics code in the digital image;

decoding the visual graphics code to obtain decoded information stored by the visual graphics code and classify the decoded information, wherein a specified character string is contained in the decoded information; and processing the decoded information according to the classification of the decoded information;

wherein, when the character string is a piece of numbers or letters with a fixed length, it is determined that the category of the decoded information is commodity information in an exhibition category, displaying the commodity information by a display window;

when the character string begins with "VCARD" or "MECARD", it is determined that the category of the decoded information is business card information in a storage category, storing the business card information in a contact database of the mobile terminal;

when the character string comprises characters in a form of URL, it is determined that the category of the decoded information is URL information in a category of authenticating security by a server, sending the URL information to a server, and receiving the security authentication result of the URL information returned by the server;

when the character string comprises characters in a form of market://, it is determined that the category of the decoded information is electronic market application download link information in a category of authenticating security by a server, sending the URL information to a server, and receiving the security authentication result of the electronic market application download link information returned by the server;

when the character string comprises characters in a form of mailto, it is determined that the category of the decoded information is mail information in a category of invoking an application for processing, processing the mail information by an e-mail system;

when the character string comprises characters in a form of tel, it is determined that the category of the decoded information is telephone information in a category of invoking an application for processing, processing the telephone information by a speech processing system; and/or when the character string comprises characters in a form of sms, it is determined that the category of the decoded information is short message information in a category of invoking an application for processing, processing the short message information by a short message system.

11. The mobile terminal for processing a visual graphics code as claimed in claim 10, wherein the analyzing the digital image to obtain the visual graphics code in the digital image comprises:
    determining that the digital image contains a visual graphics code and extracting the visual graphics code from the digital image, when it is judged that a positioning graphics of the visual graphics code exists in the digital image.

12. The mobile terminal for processing a visual graphics code as claimed in claim 11, wherein the extracting the visual graphics code from the digital image comprises:
    obtaining coordinates of a center point of the positioning graphics of the visual graphics code in the digital image, and determining coordinates and orientation of a center point of the visual graphics code in the digital image according to the coordinates of the center point of the positioning graphics; and
    extracting the visual graphics code from the digital image according to the coordinates and orientation of the center point of the visual graphics code.

13. The mobile terminal for processing a visual graphics code as claimed in claim 10, wherein the decoding the visual graphics code and classifying decoded information obtained after decoding comprises:
    classifying the decoded information obtained after decoding according to a specific format comprised in the decoded information.

14. The mobile terminal for processing a visual graphics code as claimed in claim 10, wherein the classification of the decoded information comprises at least one of the following: exhibition category, storage category, category of invoking an application for processing, and category of authenticating security by a server.

15. The mobile terminal for processing a visual graphics code as claimed in claim 13, wherein the processing the decoded information according to the classification of the decoded information comprises:
    sending the decoded information to a server, and receiving security authentication result of the decoded information returned by the server.

16. The mobile terminal for processing a visual graphics code as claimed in claim 13, wherein the processing the decoded information according to the classification of the decoded information comprises:
    when the category of the decoded information is commodity information, sending barcode information of the commodity to a server, and after security authentication information of the commodity returned by the server is received, displaying basic information and the security authentication information of the commodity by a display window.

17. The mobile terminal for processing a visual graphics code as claimed in claim 13, wherein the processing the decoded information according to the classification of the decoded information comprises:
    when wifi information is obtained from the decoded information, the mobile terminal invoking a wifi connection program of the system to connect a specified wifi hotspot using content provided in the wifi information.

18. A non-transitory computer readable medium having instructions stored thereon that, when executed by at least one processor, cause the at least one processor to perform operations for a mobile terminal to process a visual graphics code, comprising:
    obtaining a digital image recorded by the mobile terminal;
    analyzing the digital image to obtain a visual graphics code in the digital image;
    decoding the visual graphics code to obtain decoded information stored by the visual graphics code and classifying the decoded information, wherein a specified character string is contained in the decoded information; and
    processing the decoded information according to the classification of the decoded information;
    wherein, when the character string is a piece of numbers or letters with a fixed length, it is determined that the category of the decoded information is commodity information in an exhibition category, displaying the commodity information by a display window;
    when the character string begins with "VCARD" or "MECARD", it is determined that the category of the decoded information is business card information in a storage category, storing the business card information in a contact database of the mobile terminal;
    when the character string comprises characters in a form of URL, it is determined that the category of the decoded information is URL information in a category of authenticating security by a server, sending the URL information to a server, and receiving the security authentication result of the URL information returned by the server;
    when the character string comprises characters in a form of market://, it is determined that the category of the decoded information is electronic market application download link information in a category of authenticating security by a server, sending the URL information to a server, and receiving the security authentication result of the electronic market application download link information returned by the server;
    when the character string comprises characters in a form of mailto, it is determined that the category of the decoded information is mail information in a category of invoking an application for processing, processing the mail information by an e-mail system;
    when the character string comprises characters in a form of tel, it is determined that the category of the decoded information is telephone information in a category of invoking an application for processing, processing the telephone information by a speech processing system; and/or
    when the character string comprises characters in a form of sms, it is determined that the category of the decoded information is short message information in a category of invoking an application for processing, processing the short message information by a short message system.

* * * * *

UNITED STATES PATENT AND TRADEMARK OFFICE
CERTIFICATE OF CORRECTION

PATENT NO. : 9,916,486 B2
APPLICATION NO. : 14/896307
DATED : March 13, 2018
INVENTOR(S) : Huang et al.

Page 1 of 1

It is certified that error appears in the above-identified patent and that said Letters Patent is hereby corrected as shown below:

On the Title Page

The CN priority data should appear as follows:
-- (30) Foreign Application Priority Data
Jun. 5, 2013 (CN) ...............201310222415 --.

Signed and Sealed this
Eighth Day of May, 2018

Andrei Iancu
*Director of the United States Patent and Trademark Office*